L. T. LEET.
SEWAGE DISPOSAL.
APPLICATION FILED NOV. 17, 1909. RENEWED APR. 3, 1913.
1,079,569.
Patented Nov. 25, 1913.
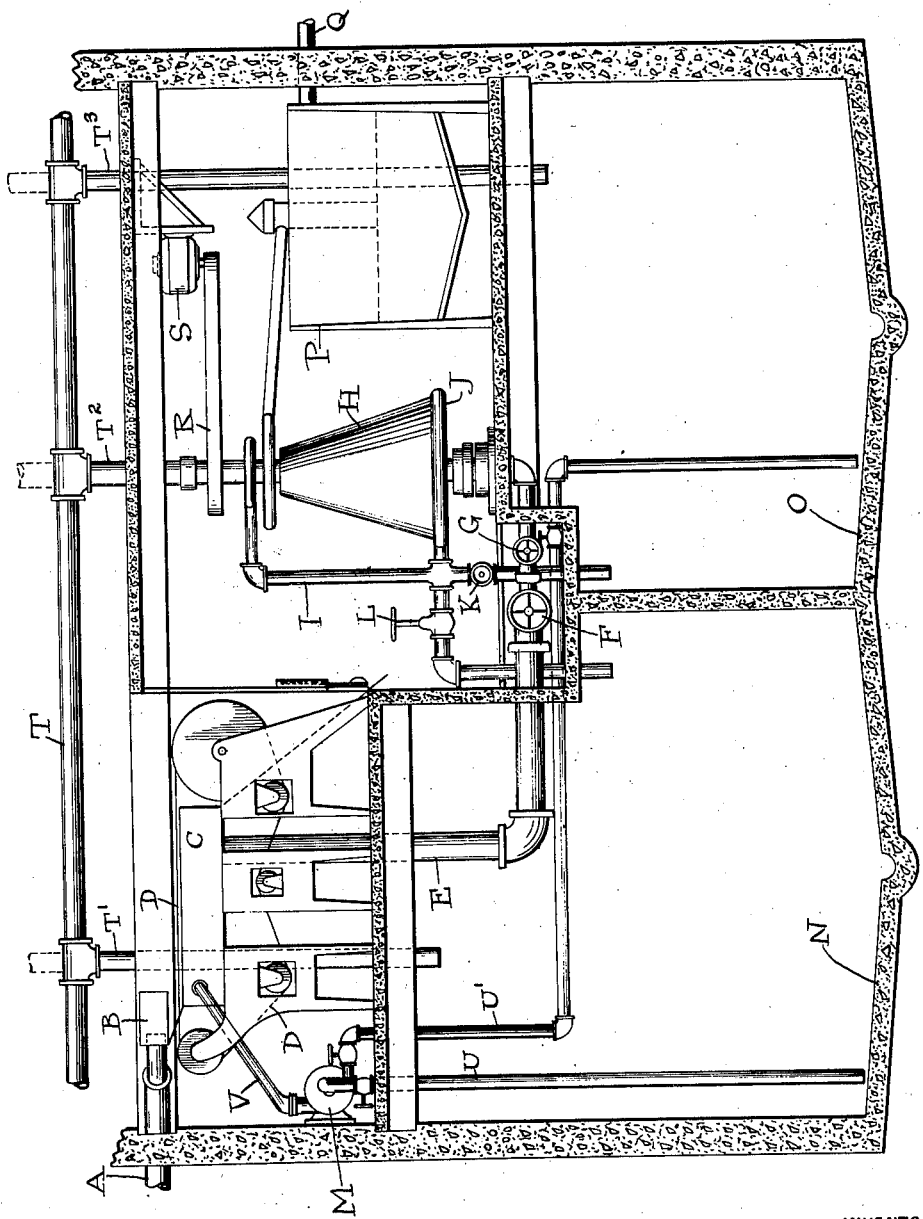
WITNESSES:
Geo. A. Senior
Dora C. Andersen.
INVENTOR,
Lynn T. Leet,
BY
G.A.O.Rosell,
ATTORNEY

UNITED STATES PATENT OFFICE.

LYNN T. LEET, OF READING, PENNSYLVANIA, ASSIGNOR TO WATER & SEWAGE PURIFICATION COMPANY, OF NEW YORK, N. Y., A CORPORATION OF DELAWARE.

SEWAGE DISPOSAL.

1,079,569.      Specification of Letters Patent.      Patented Nov. 25, 1913.

Application filed November 17, 1909, Serial No. 528,614. Renewed April 3, 1913. Serial No. 758,714.

*To all whom it may concern:*

Be it known that I, LYNN T. LEET, a citizen of Canada, and resident of Reading, in the county of Berks and State of Pennsylvania, have invented certain new and useful Improvements in Sewage Disposal, of which the following is a specification.

This invention relates to the purification of sewage and has in view a decrease in the size of the tanks used in the septic treatment and an increase in the speed and efficiency of the treatment, as will now be explained, reference being had to the following specification and claims.

The drawing is a vertical section partly in elevation showing two septic tanks, a centrifugal separator and piping for conveying the material treated and other detail which will now be explained.

Referring to the drawing there is shown an inlet pipe A provided with a deflector B, a tank C into which the sewage passes over a traveling screen D. From the tank C the sewage passes through the pipe E into the centrifugal separator H. The pipe E is provided with the admission and regulating valves F and G. From the centrifugal the material carrying the bulk of the solids passes from the lower portion J and the pipe I into the septic tanks N and O, the septic tanks being used alternately. The flow of the material into the tanks N and O is controlled by the valves K and L, and the outflow of the liquid from the septic tanks is regulated by suitable valves, not shown. From the centrifugal H, the portion that contains only a very slight percentage of solids passes into a tank P from which it flows out through the pipe Q. The centrifugal is driven by a belt R operated by a motor S. To deodorize the material during the operation, ozonized air is applied. The ozonized air is produced in any of the known ways and passed through the tube T from which it passes through the branch tubes T', T² and T³ into the septic tanks and the centrifugal separator so that the operation of treating the sewage is carried on without producing any nuisance.

M is a pump by means of which liquid is carried from the septic tanks N and O through valved pipes U and U' and delivered into the tank C through the pipe V.

To carry out this process, the bulk of the solids carried by the sewage is first separated preferably mechanically as thereby the slow feature of separating solids by settling in tanks is avoided. The separation may conveniently be effected by means of forced filtration or by means of a centrifugal machine, the separated solid portion carrying about 90% of water and sometimes more. The solid portion is then subjected to septic action in septic tanks, where it becomes liquefied by the action of anerobic bacteria, which for this purpose need not have a capacity of more than 1% of what is required when the whole volume of the sewage is subjected to septic treatment. When the septic action has liquefied the solid putrescible constituents of the material the liquid is discharged, either by itself or with the liquid separated by the centrifugal treatment or the filtration, or it may be discharged into the main body of the sewage at the point where the sewage is separated into portions that are solid or liquid or portions which carry a high percentage of solid matter and portions which carry a low percentage of solid matter. If the liquid is discharged by itself it is preferably subjected to a disinfecting process previous to its discharge such as injection of ozonized air until it is deodorized.

The liquid portion separated may either be immediately discharged in which case the slow action of the atmosphere is relied upon for its deodorization or it may be treated with a disinfectant such as ozonized air to deodorize it before being discharged. If the liquid from the septic treatment is added to the liquid separated by the mechanical treatment or to the sewage immediately before the mechanical treatment, the mixture is treated exactly as if the liquid from the septic treatment had not been added.

What I claim as new is:

1. The process of treating sewage which consists in separating sewage into two parts one containing a high percentage of solids and the other a low percentage of solids, conveying the former to a closed septic tank and there permitting it to be liquefied by the action of anerobic bacteria.

2. The process of treating sewage which consists in separating sewage into two parts one containing a high percentage of solids and the other a low percentage of solids, conveying the former to a closed septic tank and permitting it to be liquefied by the action of anerobic bacteria and oxidizing the effluent from the septic tank.

3. The process of treating sewage which consists in separating sewage into two parts, one containing a high percentage of solids and the other a low percentage of solids, conveying the former to a closed septic tank and permitting it to be liquefied by the action of anerobic bacteria and conveying the liquid resulting from the septic action to raw sewage previous to being subjected to the separative treatment.

4. The process of treating sewage which consists in separating sewage into two parts, one containing a high percentage of solids and the other a low percentage of solids, conveying the former to a closed septic tank and there permitting it to be liquefied by the action of anerobic bacteria and subjecting the latter to an oxidizing treatment.

5. The process of treating sewage which consists in separating sewage into two parts, one containing a high percentage of solids and the other a low percentage of solids, conveying the former to a closed septic tank and there permitting it to be liquefied by the action of anerobic bacteria and subjecting the latter together with the effluent from the septic tank to an oxidizing treatment.

6. The process of treating sewage which consists in separating sewage into two parts, one containing a high percentage of solids and the other a low percentage of solids, conveying the former to a closed septic tank and there permitting it to be liquefied by the action of anerobic bacteria, and subjecting the latter together with the effluent from the septic tank to a deodorizing and disinfecting treatment.

7. The process of treating sewage which consists in separating sewage into two parts, one containing a high percentage of solids and the other a low percentage of solids, conveying the former to a closed septic tank and there permitting it to be liquefied by the action of anerobic bacteria and subjecting the latter together with the effluent from the septic tank to a deodorizing and disinfecting treatment and subjecting the gases emanating from the septic tank to a deodorizing and disinfecting treatment.

Signed at New York in the county of New York and State of N. Y. this 15th day of Nov. A. D. 1909.

LYNN T. LEET.

Witnesses:
C. A. O. ROSELL,
DORA C. ANDERSEN.